June 12, 1962  F. WAHL  3,038,674
APPARATUS FOR WINDING STRANDS
Filed Dec. 30, 1960  4 Sheets-Sheet 1

INVENTOR
F. WAHL
By W. C. Johnson
ATTORNEY

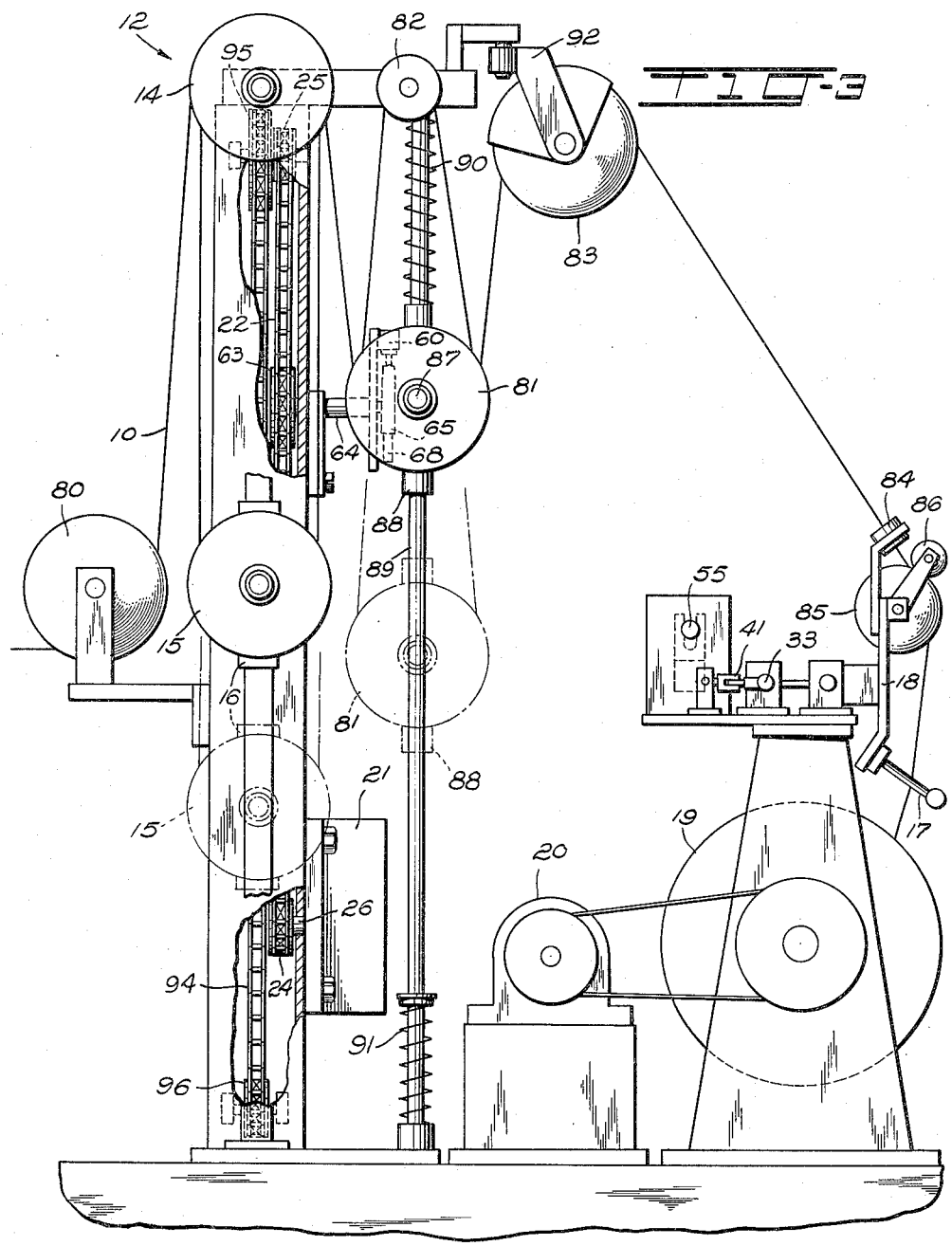

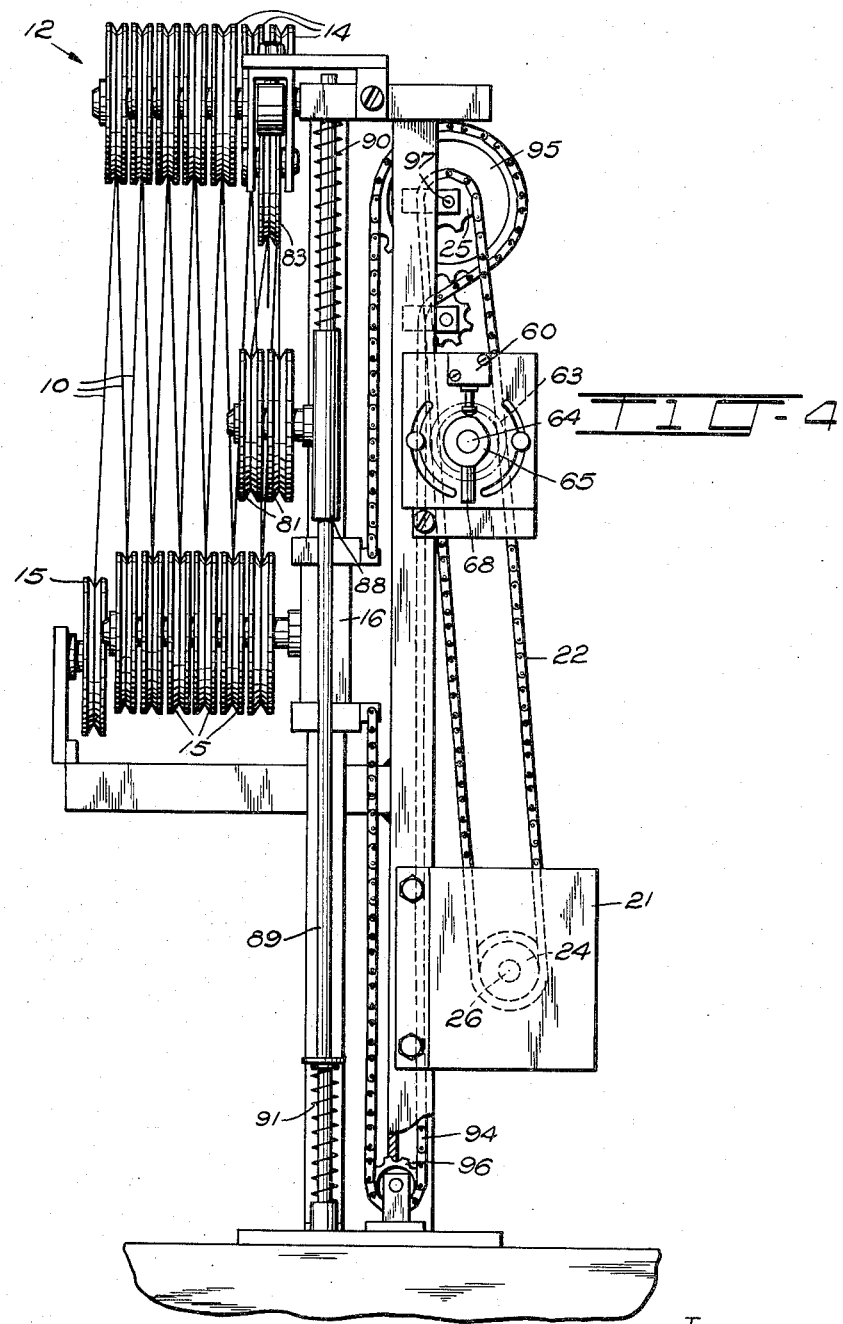

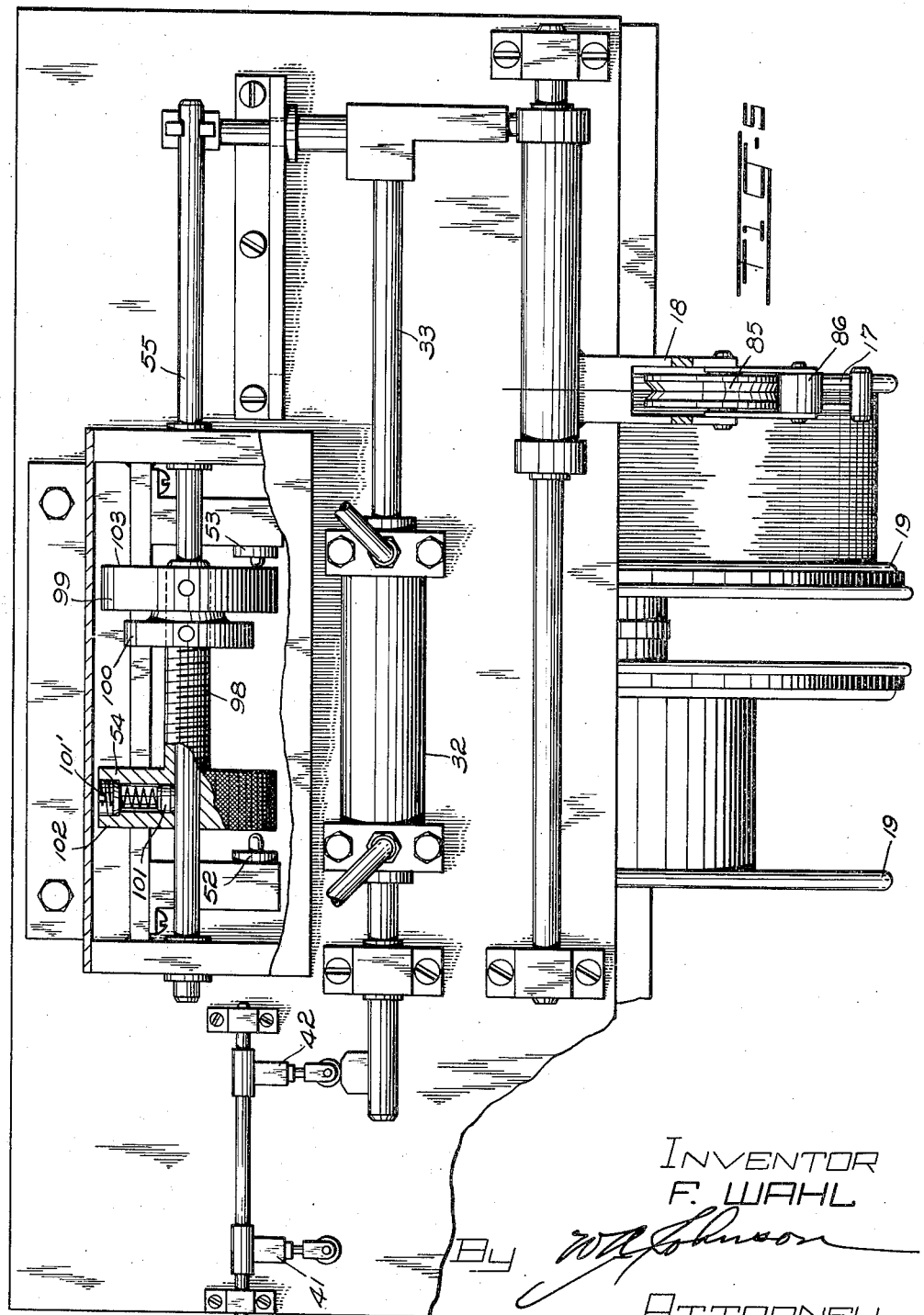

3,038,674
APPARATUS FOR WINDING STRANDS
Frank Wahl, North Bergen, N.J., assignor to Western Electric Company, Incorporated, New York, N.Y., a corporation of New York
Filed Dec. 30, 1960, Ser. No. 79,636
8 Claims. (Cl. 242—25)

This invention relates to apparatus for winding strands, particularly apparatus for causing uniform distribution of strands on take-up reels.

In the manufacture of plastic coated electrical conductors, the conductors or covered wires are advanced continuously from an extruder to a take-up mechanism. The take-up mechanism is adapted to distribute the wire on one of a pair of reels until the reel is filled and then transfer the wire to the other reel. Furthermore, the wire is advanced through the aid of a capstan at a known linear speed and, in apparatus of this type, the take-up reels are driven at variable speeds attempting to compensate for the varied speeds necessary to take-up the wire on each reel as the turns of wire increase in diameter for each layer of wire on the reel. The wire, in passing from the capstan to the take-up reel, usually travels about a dancer weight unit where numerous loops are formed in the wire causing the weighted roller of the unit to move up and down with variations in the take-up speed of the wire. Apparatus of this type has rheostats in the take-up motor circuits attempting to vary the speeds of the take-ups to approach, as nearly as possible through this means, the distribution of even layers of turns of the wire on the take-up reels. However, regardless of these controlling means, there are times when there are pile-ups of convolutions or turns of the wire on the take-up reel, resulting in valleys in the overall turns of the wire on the take-up reel which may have disturbing effects when removing the wire from the reel at a future time.

An object of the present invention is a control means in an apparatus of the type described which is highly efficient in controlling the reciprocable strokes of the distributor to create even lay of the wire on take-up reels.

Other objects and advantages will be apparent from the following detailed description when considered in conjunction with the accompanying drawings wherein:

FIG. 3 is an end elevational view of the apparatus;

FIG. 4 is a front elevational view of the apparatus; and

FIG. 5 is a top plan view of the distributor portion of the apparatus.

Figures 1, 2:
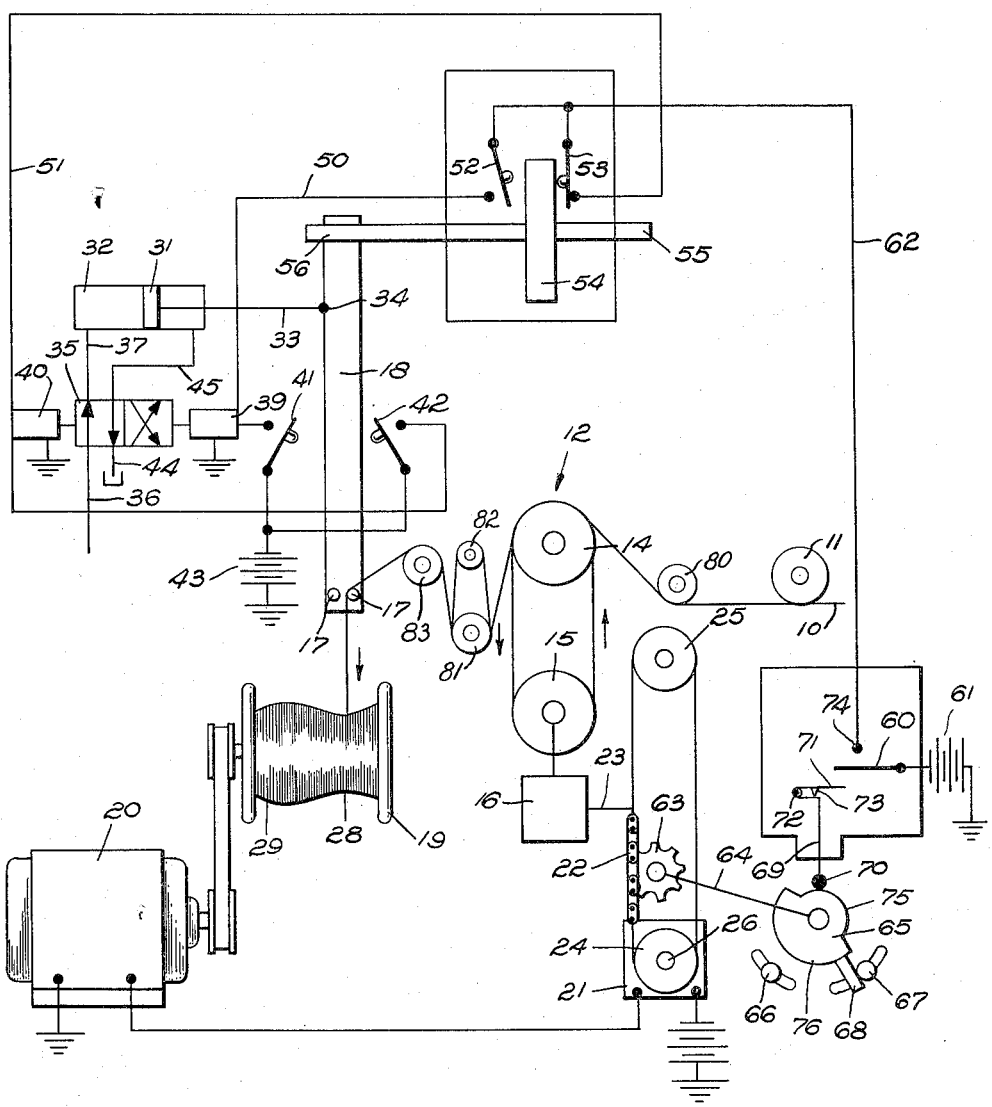
FIG. 1 is a schematic view of the invention incorporated in an apparatus for winding a strand.
FIG. 2 is a fragmentary sectional view of a reel roughly illustrating the winding of extra layers in a valley to produce uniform lays of the strand.

Considering first the schematic illustration in FIG. 1, a strand such as a plastic covered wire 10 is advanced in a conventional manner by a capstan 11 at a given linear speed from an extruder, not shown. As the strand 10 leaves the capstan 11, it approaches a dancer weight unit 12 which includes multiple-grooved fixed position rollers 14 and multiple-grooved movable rollers 15 carrying a weight 16. Multiple loops of the strand 10 pass about the rollers 14 and 15 after which the strand passes on to fingers 17 of a distributor 18. The distributor, through the aid of its fingers 17, distributes turns of the strand on a take-up reel 19 which is driven by a variable speed motor 20. The speed of the motor 20 is under control of a rheostat 21 which is driven by a chain 22 to which the weight 16 is secured at 23. The chain 22 extends around sprockets 24 and 25, the sprocket 24 being fixed to a shaft 26 of the rheostat 21.

Normally, at the beginning of the winding operation, the motor 20 will wind turns on the take-up reel at a given speed and as the layers of strand build up on the take-up reel, tending to move the strand at a faster linear speed adjacent the take-up reel due to the increased diameters of the turns of the strand, the loops of the strand in the dancer weight unit 12 will be affected tending to move the rollers 15 and the weight 16 upwardly causing movement of the chain 22 to operate the rheostat 24 to reduce the speed of the motor in an attempt to compensate for the tendency for increasing linear speed of the strand adjacent the take-up reel so that the actual linear speed, between the dancer weight unit 12 and the take-up reel, will be nearly identical to the linear speed of the wire at the capstan 11. However, this condition does not always exist and sometimes valleys 28 and 29 are formed. It is recognized that the illustration of the valleys 28 and 29 is extreme, the purpose being to more clearly illustrate the invention.

In the present instance, the distributor 18 is under the control of a piston 31 of fluid cylinder 32, the piston having a rod 33 connected at 34 to the distributor. In the schematic illustration, the apparatus includes a double acting valve 35 which, when in the position shown, will direct fluid under pressure from a supply line 36 through line 37 to the left side of the piston 31, forcing the distributor to move at a controlled speed to the right.

The valve 35 is under the control of solenoids 39 and 40 which are disposed in circuits under the control of normally open switches 41 and 42 disposed at predetermined limits depending upon the size of the take-up reel to bring about reversing actions of the distributor. With the distributor 18 approaching the switch 42, this switch will be closed at the right limit completing a circuit from grounded battery 43 through switch 42 and solenoid 40 to ground. Energization of solenoid 40 will move the valve 35 to the left, bringing about a reversing action, allowing fluid in the left end of the cylinder 32 to exhaust through line 37 and exhaustport 44 while, at the same time, allowing fluid under pressure from the supply line 36 to pass through line 45 and enter the cylinder at the right of the piston 31. This starts the movement of the distributor to the left. The features thus described, are parts of an apparatus employed to illustrate the invention.

The purpose of the invention is to control the distributor 18 so that the existence of any valleys 28—29 in the turns of the strand on the take-up reel will bring about controlled movements of the distributor in the area of these valleys to fill the valleys with extra layers of turns to level off the overall turns on the reel. This is brought about through the aid of auxiliary circuits 50 and 51 for the solenoids 39 and 40. The auxiliary circuits 50 and 51 have sensing switches 52 and 53 which are normally open but which are closed alternately through the aid of an element 54 frictionally mounted on a rod 55 carried at 56 by the distributor 18.

According to the illustration in FIG. 1, the distributor 18 is moving to the right. At the start of this movement, the element 54 moved from engagement with the switch 52 to the position now shown where it closed switch 53. Additional movement of the distributor will allow the rod 55 to move through the element 54 due to the frictional contact between the element and the rod but, as soon as the distributor starts its movement to the left, the element will move away from the switch 53 toward and eventually close the switch 52. For this reason, the switches 52 and 53 are called sensing switches in that they sense the direction the distributor is traveling and through the aid of an impulse switch 60, either auxiliary circuit 50 or 51 may be closed, depending upon which switch 52 or 53 is closed to reverse the action of the distributor. The impulse switch 60 is in a circuit with a grounded battery 61 and is connected when closed through a line 62 to both switches 52 and 53. The means for operating the impulse switch 60 is responsive to the weight 16 or the weight carrying roller 15 which operates the chain 22.

In the present instance, a sprocket 63 is driven in reverse directions by the chain 22 to drive a shaft 64. A cam 65 is frictionally mounted on one end of the shaft 64 and adapted to rotate between adjustably positioned stops 66 and 67 to be engaged by a projection 68 of the cam. An actuator 69 mounted for vertical movement has a roller 70 riding on the cam 65 and provided with a member 71 hinged at 72 and supported at 73 to engage the switch 60 and move it against its contact 74 on the upward stroke of the actuator 69. At the present time, the actuator is supported on a low portion 75 of the cam causing the impulse switch 60 to remain open. This position is reached during downward movement of the weight 16 or the movement of the strand into a valley such as the valley 28, but as the strand moves out of the valley, causing the weighted rollers 15—16 to move upwardly, the cam 65 is rotated to move the high portion 76 under the roller 70 to move the actuator 69 upwardly and close switch 60 momentarily. Actually, the actuator moves past the switch 60 after causing it to engage its contact. This impulse is sufficient to operate either solenoid. When moved downwardly, the hinged member 71 moves free of the switch 60.

The apparatus is shown more in detail in FIGS. 3, 4, and 5. In FIG. 3 the strand 10, after leaving the capstan 11, is guided by a grooved roller 80 prior to reaching the first groove in the fixed position rollers 14. The strand is then threaded about the rollers 14 and 15 of the dancer weight unit 12, as illustrated in FIG. 4, after which the strand passes around a first roller in vertically movable double rolls 81, about a single grooved roll 82, about a second roll 81, about a roll 83, through a guide 84, a grooved roll 85, beneath a roll 86 and between the fingers 17 of the distributor to the take-up reel 19. The rolls 81 are mounted on a spindle 87, supported by an apertured member 88, disposed on a guide rod 89 between a top spring 90 and a bottom spring 91. The roll 82 has its spindle mounted at a fixed position adjacent the multiple rollers 14, while the roll 83 has its spindle supported by a pivotal yoke 92.

In FIG. 1 the schematic illustration of the driving connection between the weight 16 and the rheostat 21, as well as the cam 65, illustrates one chain 22. Actually, as illustrated in FIG. 4, there are two chains, the first chain 94 having its ends connected to the weight 16 and extending around sprockets 95 and 96. The sprocket 95 is mounted on a spindle 97 which has a smaller sprocket 25 mounted thereon. The sprockets 24 and 25 in FIG. 4 illustrate the chain 22 mounted thereon for driving sprocket 63 on spindle or shaft 64, for driving the cam 65, to operate the switch 60. Also, the sprocket 24 drives spindle 26 for operating rheostat 21.

In FIG. 5, the reference numbers applied to the distributor mechanism of FIG. 1 are applied to their more detailed structures shown in this figure. In FIG. 5 the element 54 is shown in detail, it being provided with a threaded portion 98 through which the rod 55 extends and on which a member 99 is adjustable and held in any desired adjusted position by a nut 100. Also, one or more spring pressed members 101 disposed in one or more apertures of the element 54 may engage the rod 55 under variable pressures of the springs as a result of adjustable screws 101' threadedly disposed in the apertures to cause the element to follow movement of the rod until it and its member 99 are stopped by either switch 52 or 53. With this structure, there may be brought about variations in the spacing of surfaces 102 and 103 of the element relative to their switches 52 and 53. This creates the desired time lag desired for conditioning of the switch 60 or its movement into open position after reversing the direction of the distributor prior to another reverse action caused by the strand moving out of a valley, resulting in the upward movement of the weighted roller 15.

*Operation*

During the normal operation of the apparatus, it is recognized that if the strand is moved onto the take-up reel at the same linear speed the strand leaves the capstan 11, there would be no need for control means. However, the change in the linear speed of the strand immediately approaching the take-up reel, resulting from the increase in diameter of the winding area of the reel for each layer of strand, creates the necessity for a change in the speed of rotation of the reel. The rheostat drive was intended to compensate for this variation but due to the fact that there is not an immediate change in speed with the change in layers of the strands on the reel, there is frequently the formation of what is called valleys in the layers of strands on the take-up reel. The valleys 28 and 29, illustrated in FIG. 1, are exaggerated purposely to illustrate the invention. With the distributor in FIG. 1 moving to the right, the strand 10 has entered the valley 28 and is about to climb out of the valley onto the turns with greater diameters. As the strand moves from the higher portion between the valleys down into the valley 28, the weighted roller 15 moved downwardly as a result of the slackness in the strand, causing the weight 16 to move the chain 22 and move the actuator 69 to the down or cocked position and the cam 65 to the position shown in FIG. 1.

Continued movement of the distributor 18 to the right causes the strand to start its travel out of the valley 28 and bring about upward movement of the weighted roller 15. This will cause the weight to move its chain 22, to rock the sprocket 63 clockwise and to move the cam 65 from its stop 67 toward its stop 66 and cause momentary closing of the switch 60 by the actuator 69 immediately supplying current to one of the auxiliary circuits depending upon which switch 52 or 53 is closed.

In this instance, the distributor being moved to the right has caused the element 54 to close switch 53, thus a circuit is completed from grounded battery 61, through closed switches 60 and 53, to operate solenoid 40, moving the valve 35 to the left to cause immediate reversal of the distributor moving it to the left to distribute another layer of strand in the valley 28. The actuator 69 is designed to momentarily close switch 60 which is sufficient to actuate the valve 35 through energization of the solenoid 40. Therefore, the distributor, after being reversed to start another layer of turns in the valley 28, will continue this movement with the strand moving down into the valley and until the strand starts to move out of the valley on the left side thereof. As soon as the strand starts its movement down into the valley, actuator 69 will by-pass switch 60, but the start of the strand's movement out of the valley on the other side will cause another closing operation of the switch 60 to bring about the distribution of another layer of strand in the valley. During each instance, the strand moves out of the valley far enough to actuate the switch 60 to bring about reverse movement of the distributor and when moving back into the valley, the cam 65 will be returned to the position shown conditioning it for another operation as the strand moves out of the valley on the left side. This condition will be repeated until the valley is filled and there will be no further action of the switch 60 until another valley appears such as the valley 29. Contrary to the exaggerated valley illustrations 28 and 29, with the present setting, there will not exist a valley of greater depth than two strand thicknesses.

With regard to the valley 29, if the strand approaches the valley from the right side moving toward the left, there will be no repeated action until the distributor is reversed by the switch 41 and the strand starts its climb out of the valley onto the higher portions of the turns, at which time, the dancer unit will operate the cam 65, close the switch 60 to bring about reversing of the distributor to apply one or more layers of turns in the valley 29. Therefore, with the auxiliary circuits 50 and 51, there sensing switches 52 and 53, and the variable element 54, responsive to the direction of movement of the distributor 18, the auxiliary circuits are conditioned to receive electrical energy from the source 61 whenever the impulse switch 60 is closed.

The impulse switch 60 is closed whenever there exists a valley in the turns on the reel; this switch depending upon the sensing switches to direct the electrical energy to the proper unit 39 or 40 to bring about actuation of the valve 35 at intervals between the usual actuations thereof caused by the closing of the limit switches 41 and 42.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for winding a strand on a driven take-up reel, the combination with a dancer weight unit with multiple fixed position rollers and multiple movable weight carrying rollers about which multiple loops of the strand pass and a distributor for the strand normally operated between given limits, of a drive means for the distributor reversed at predetermined positions electrically operable units under the control of limit switches operable to render the drive means effective to cause the distributor normally to direct turns of the strand on the take-up reel between heads thereof, auxiliary circuits for the units, sensing switches for the auxiliary circuits, means responsive to the distributor to alternately close the switches for the auxiliary circuits to condition them singly to operate their units to reverse the distributor prior to reaching either of its limit switches when the weight carrying rollers have moved downwardly as a result of a valley in the turns on the reel and starts moving upwardly as a result of the distributed strand climbing out of the valley, and a normally open impulse switch adapted when closed to complete either auxiliary circuit the sensing switch of which is closed to cause reversing of the distributor short of its limit to cause distribution of an extra layer of turns in the valley.

2. An apparatus according to claim 1 in which the means responsive to the distributor to alternately close the sensing switches comprises a rod movable with the distributor in a path adjacent the sensing switches, and an element disposed on the rod and movable therewith alternately to actuate the sensing switches into closed positions.

3. An apparatus according to claim 2 in which a variable pressure applying member is mounted and adapted to engage the rod under variable pressure to cause the element to follow movement of the rod until the element is stopped by either sensing switch.

4. An apparatus according to claim 3 in which the element includes spaced members having surfaces respectively adapted to actuate their sensing switches, and intermediate means adapted to vary the space between the surfaces of the members to vary an interval of time between actuations of the sensing switches.

5. An apparatus according to claim 1 in which an actuator for the impulse switch is mounted for movement adjacent said switch, and stops for the actuator limiting movement of the actuator in opposing directions relative to said switch.

6. An apparatus according to claim 5 in which a drive actuable by the weight carrying rollers causes movement of the actuator in one direction to close the impulse switch when the weight carrying roller moves upwardly.

7. An apparatus according to claim 5 in which the actuator is in the form of a cam, a shaft supporting the actuator and forming a friction driving connection therewith, and means responsive to movements of the weight carrying roller to rock the actuator to respectively close and open the impulse switch.

8. An apparatus according to claim 7 in which a projection is mounted on the cam-like actuator, and spaced stops for the projection limiting distances of movement of the actuator.

References Cited in the file of this patent

UNITED STATES PATENTS

| | | |
|---|---|---|
| 1,140,924 | Underhill | May 25, 1915 |
| 2,845,229 | Bliss | July 29, 1958 |
| 2,883,120 | Foster et al. | Apr. 21, 1959 |
| 2,929,569 | Detrick et al. | Mar. 22, 1960 |